US009510178B2

(12) United States Patent
Chu et al.

(10) Patent No.: US 9,510,178 B2
(45) Date of Patent: Nov. 29, 2016

(54) METHOD FOR ALLOWING A SUCCESSFUL FIRST MOBILE TERMINATED CALL TOWARDS A MOBILE SUBSCRIBER INITIALLY ASSIGNED TO A FAILING CORE NETWORK NODE (75) Inventors: Haibin Chu, Shanghai (CN); Yingjiao He, Shanghai (CN); Linhai Jiang, Shanghai (CN); Chunbo Wang, Shanghai (CN); Jacky Wu, Shanghai (CN); Mingqiu Xu, Shanghai (CN); Henry Zheng, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 14/371,156

(22) PCT Filed: Jan. 9, 2012

(86) PCT No.: PCT/CN2012/070146
§ 371 (c)(1),
(2), (4) Date: Jul. 8, 2014

(87) PCT Pub. No.: WO2013/104101
PCT Pub. Date: Jul. 18, 2013

(65) Prior Publication Data
US 2015/0017980 A1 Jan. 15, 2015

(51) Int. Cl.
*H04W 4/00* (2009.01)
*H04W 8/04* (2009.01)
(Continued)

(52) U.S. Cl.
CPC ............... *H04W 8/04* (2013.01); *H04W 8/26* (2013.01); *H04W 24/04* (2013.01); *H04W 68/00* (2013.01); *H04W 76/027* (2013.01); *H04W 8/30* (2013.01); *H04W 36/12* (2013.01)

(58) Field of Classification Search
CPC ......... H04W 8/04; H04W 8/30; H04W 8/26; H04W 36/12; H04W 76/027; H04W 24/04; H04W 68/00
USPC ........................ 455/432.1, 433, 435.1, 456.1
See application file for complete search history.

(56) References Cited

U.S. PATENT DOCUMENTS 6,097,951 A * 8/2000 Ernam ................... H04W 28/08
455/433
6,167,264 A * 12/2000 Palviainen .............. H04W 8/06
435/445
(Continued)

FOREIGN PATENT DOCUMENTS

CN 1852549 A 10/2006
CN 101969659 A 2/2011
(Continued)

OTHER PUBLICATIONS

International Search Report, PCT Application No. PCT/CN2012/070146, Oct. 18, 2012.
(Continued)

*Primary Examiner* — Khai M Nguyen
(74) *Attorney, Agent, or Firm* — Myers Bigel, P.A.

(57) ABSTRACT

A method for a fallback core network node within core network nodes for a first mobile terminated call towards a mobile subscriber initially assigned to a failing ore network node (failing CNN). The method includes receiving data associated to International Mobile Subscriber Identity and Location Area Identifier (LAI) of a mobile subscriber handled in the failing CNN. The method includes receiving a service request from a home location register (HLR), whereby the service request indicates that the fallback CNN is acting as a fallback CNN for the failing CNN, and sending a response to the service request towards the HLR comprising the roaming Number assigned by the fallback CNN. The method includes initiating a paging request towards the radio network comprising said received LAI of said mobile subscriber, and sending a Service Request towards the HLR comprising the Mobile Station Integrated Services Digital Network Number of the mobile subscriber.

14 Claims, 7 Drawing Sheets (51) Int. Cl.
*H04W 76/02* (2009.01)
*H04W 24/04* (2009.01)
*H04W 8/26* (2009.01)
*H04W 68/00* (2009.01)
*H04W 36/12* (2009.01)
*H04W 8/30* (2009.01)

(56) References Cited

U.S. PATENT DOCUMENTS

| | | | | |
|---|---|---|---|---|
| 8,942,738 | B1* | 1/2015 | Oroskar | H04W 68/02 |
| | | | | 455/426.1 |
| 8,964,698 | B2* | 2/2015 | Brombal | H04W 76/027 |
| | | | | 370/331 |
| 9,247,528 | B2* | 1/2016 | Bhaskaran | H04W 68/12 |
| 2006/0276226 | A1* | 12/2006 | Jiang | H04W 8/183 |
| | | | | 455/558 |
| 2007/0281686 | A1* | 12/2007 | Liu | H04W 8/20 |
| | | | | 455/433 |
| 2010/0316000 | A1* | 12/2010 | Burbidge | H04W 36/0022 |
| | | | | 370/328 |
| 2012/0133459 | A1* | 5/2012 | Zhuang | H04B 3/14 |
| | | | | 333/28 R |
| 2012/0302234 | A1* | 11/2012 | Wallis | H04W 36/0022 |
| | | | | 455/433 |
| 2013/0210466 | A1* | 8/2013 | Arvidsson | H04W 4/025 |
| | | | | 455/458 |
| 2013/0259001 | A1* | 10/2013 | Keller | H04W 76/027 |
| | | | | 370/331 |
| 2014/0051466 | A1 | 2/2014 | Yu | |

FOREIGN PATENT DOCUMENTS

| | | |
|---|---|---|
| CN | 102217338 A | 10/2011 |
| CN | 102232317 A | 11/2011 |
| EP | 1 928 192 A1 | 6/2008 |
| EP | 2 003 913 A2 | 12/2008 |
| WO | WO 2007/117825 A2 | 10/2007 |
| WO | WO 2011/069278 A1 | 6/2011 |
| WO | WO 2011/069279 A1 | 6/2011 |
| WO | WO 2012/055093 A | 5/2012 |

OTHER PUBLICATIONS

3GPP, Technical Specification, "3rd Generation Partnership Project; Technical Specification Group Radio Access Network; UTRAN Iu Interface Radio Access Network Application Part (RANAP) signalling (Release 10)", 3GPP TS 25.413 V10.2.0 (Jun. 2011), 425 pp.

3GPP, Technical Specification, "3rd Generation Partnership Project; Technical Specification Group Services and System Aspects; Network Sharing; Architecture and functional description (Release 10)", 3GPP TS 23.251 V10.2.0 (Jun. 2011), 27 pp.

3GPP, Technical Specification, "3rd Generation Partnership Project; Technical Specification Group Core Network and Terminals; Mobile radio interface Layer 3 specification; Core network protocols; Stage 3 (Release 10)", 3GPP TS 24.008 V10.3.0 (Jun. 2011), 638 pp.

3GPP, Technical Specification, "3rd Generation Partnership Project; Technical Specification Group Services and System Aspects; Intra-domain connection of Radio Access Network (RAN) nodes to multiple Core Network (CN) nodes (Release 10)", 3GPP TS 23.236 V10.2.1 (Jan. 2011), 39 pp.

3GPP, Technical Specification, "3rd Generation Partnership Project; Technical Specification Group Radio Access Network; Radio Resource Control (RRC); Protocol specification (Release 10)", 3GPP TS 25.331 V10.3.1 (Apr. 2011), 1863 pp.

3GPP, Technical Specification, "3rd Generation Partnership Project; Technical Specification Group GSM/EDGE Radio Access Network; Mobile radio interface layer 3 specification; Radio Resource Control (RRC) protocol (Release 10)", 3GPP TS 44.018 V10.3.0 (Jun. 2011), 434 pp.

Communication pursuant to Rules 70(2) and 70a(2) EPC with Supplementary European Search Report, European Patent Application No. 12865278.1, Oct. 20, 2015.

3GPP, Technical Specification—"3rd Generation Partnership Project; Technical Specification Group Core Network and Terminals; Basic call handling; Technical realization (Release 10)", 3GPP TS 23.018 V10.2.1 (Jun. 2011), 294 pp.

* cited by examiner

METHOD FOR ALLOWING A SUCCESSFUL FIRST MOBILE TERMINATED CALL TOWARDS A MOBILE SUBSCRIBER INITIALLY ASSIGNED TO A FAILING CORE NETWORK NODE

CROSS REFERENCE TO RELATED APPLICATION

This application is a 35 U.S.C. §371 national stage application of PCT International Application No. PCT/CN2012/070146, filed on 9 Jan. 2012, the disclosure and content of which is incorporated by reference herein in its entirety. The above-referenced PCT International Application was published in the English language as International Publication No. WO 2013/104101 A1 on 18 Jul. 2013.

TECHNICAL FIELD

The invention pertains to a method for allowing a successful first mobile terminated call towards a mobile subscriber initially assigned to a failing core network node, and in particular to a method for a fallback core network node within a pool of core network nodes.

BACKGROUND

In a normal setup a Radio Access Network node, such as a base station controller BSC/radio network controller RNC node, is typically connected to a Core Network node, such as a mobile switching center MSC, in a one-to-one relationship. Within a MSC in pool setup, sometimes abbreviated MiP, there is no need for such a one-to-one relationship but a Radio Access Network node may be connected to a plurality of Core Network nodes. Such a configuration allows for load balancing and provides improved reliability as a node failure of a Core Network node may be remedied by a fallback Core Network Node.

Figure 1:
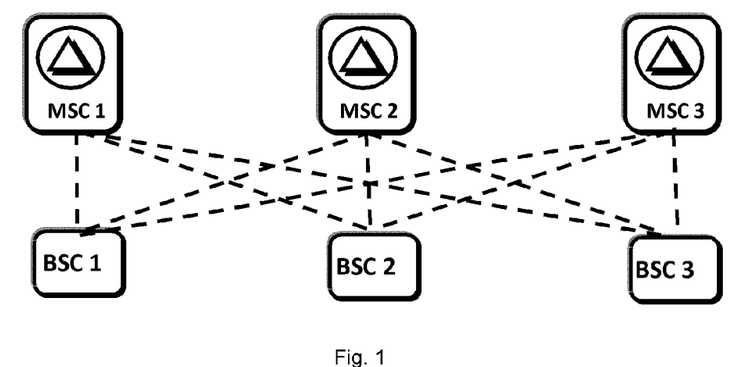
FIG. 1 is a block diagram illustrating an exemplary pool setup.

An exemplary configuration of a MSC in pool setup is shown in FIG. 1. In this MiP example, a plurality of radio access nodes, such as BSC 1, BSC 2 and/or BSC 3, may be connected to a plurality of core network nodes, such as MSC 1, MSC 2 and/or MSC 3 in any kind of relationship. I.e. in the shown scenario each MSC may communicate with any BSC, thereby allowing for performing call handling.

Figure 2:
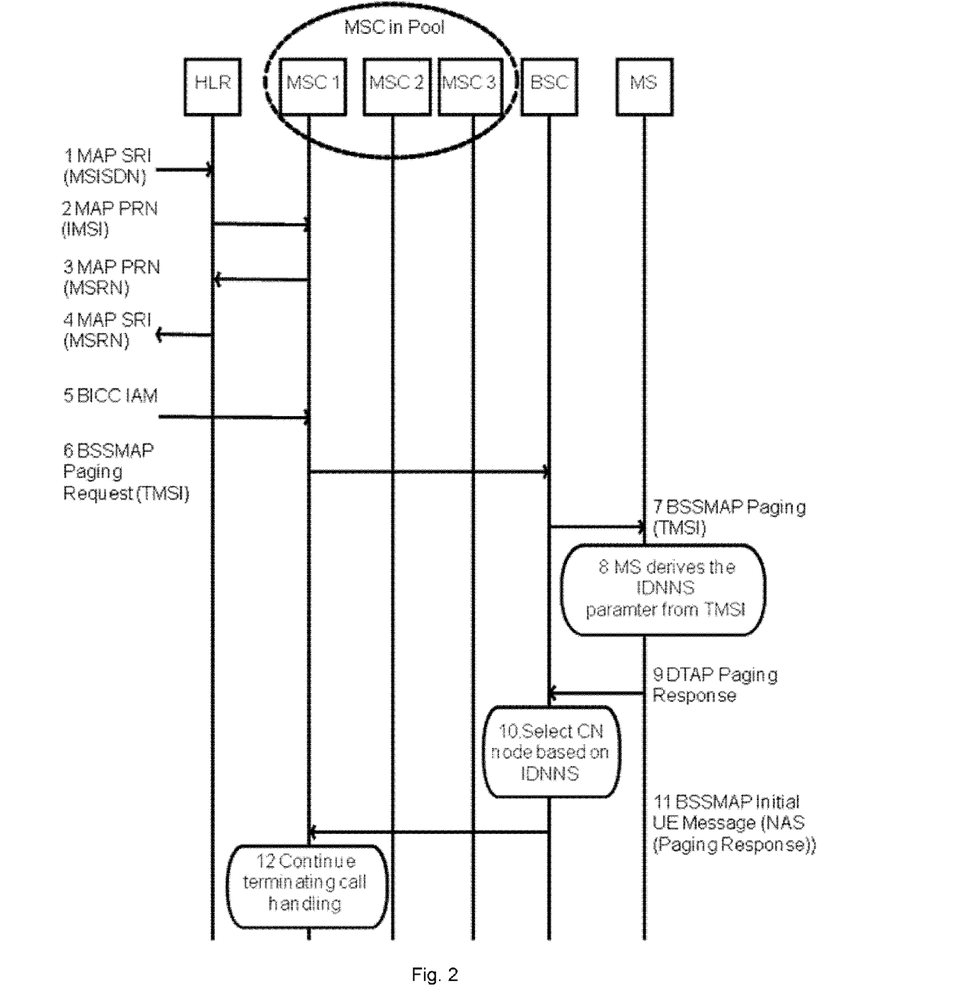
FIG. 2 is a signaling diagram illustrating exchange of signals of a successful mobile terminated call.

If no failure of a core network node is experienced, a typical Mobile Terminating call scenario in MiP: as shown in FIG. 2 with respect to a mobile terminating call handling in the GSM MiP network is happening. It is noted, that the handling in WCDMA as well as other radio networks is quite similar and therefore not shown.

In FIG. 2 it is assumed that a radio access network node BSC is connected to a plurality of core network nodes MSC 1, MSC 2, MSC 3. A Mobile Station MS of a subscriber is registered in MSC 1. Now if a call from an originating node is to be established towards said Mobile Station MS, at a certain point in time within the call processing a home location register HLR storing information pertaining to said subscriber is contacted, e.g. by a mobile application part MAP message such as Send Routing Information, sometimes abbreviated SRI, see step 1. The home location register HLR dispatches a message requesting a roaming number towards the MSC in which the Mobile Station is registered, i.e. MSC 1, e.g. a MAP message Provide Roaming Number, sometimes abbreviated PRN, see step 2.

Having received said PRN message, MSC 1 allocates a Mobile Station Roaming Number MSRN for the concerned subscriber and returns the PRN message to the home location register HLR, see step 3. In turn, the home location register HLR, returns a SRI message towards the originating core network node comprising the allocated Mobile Station Roaming Number MSRN, see step 4.

In response, the originating core network node issues an Initial Address Message, sometimes abbreviated IAM, towards the MSC 1, see step 5. The MSC 1 pages the concerned Mobile Station MS by sending a paging request, e.g. BSSMAP message Paging Request comprising a Temporary Mobile Subscriber Identity TMSI of the concerned Mobile Station MS, towards a respective Radio Access Network node BSC, see step 6.

The Radio Access Network node BSC sends a Paging message comprising said TMSI towards the Mobile Station MS, see step 7. The Mobile Station MS, in turn, derives the Intra-Domain NAS Node Selector parameter, sometimes abbreviated IDNNS, from its TMSI, see step 8. In response, the Mobile Station MS returns a Paging Response comprising IDNNS parameter and an encapsulated DTAP message Paging Response, see step 9.

The Radio Access Network node BSC selects a Core Network node, i.e. MSC 1, based on the received IDNNS parameter, see step 10 and sends a BSSMAP Complete Layer 3 message, which encapsulates DTAP message Paging Response, see step 11. The Core Network Node MSC 1, in turn, continues the terminating call setup, see step 12.

However, if an MSC within a MSC Pool is failing, the mobile terminating traffic towards the subscriber will be unsuccessful unless the Mobile Station MS is used for attempting a mobile originating call and gets registered in another MSC of said MSC Pool or in case of a periodic Location Update.

Recently, ideas have been proposed allowing to detect such a failure within a first attempt of a mobile terminating call and to trigger corrective actions. However, these solutions on the benefit that future mobile terminating calls may be successful always lead to a situation where the first mobile terminated call will fail.

Figure 3:
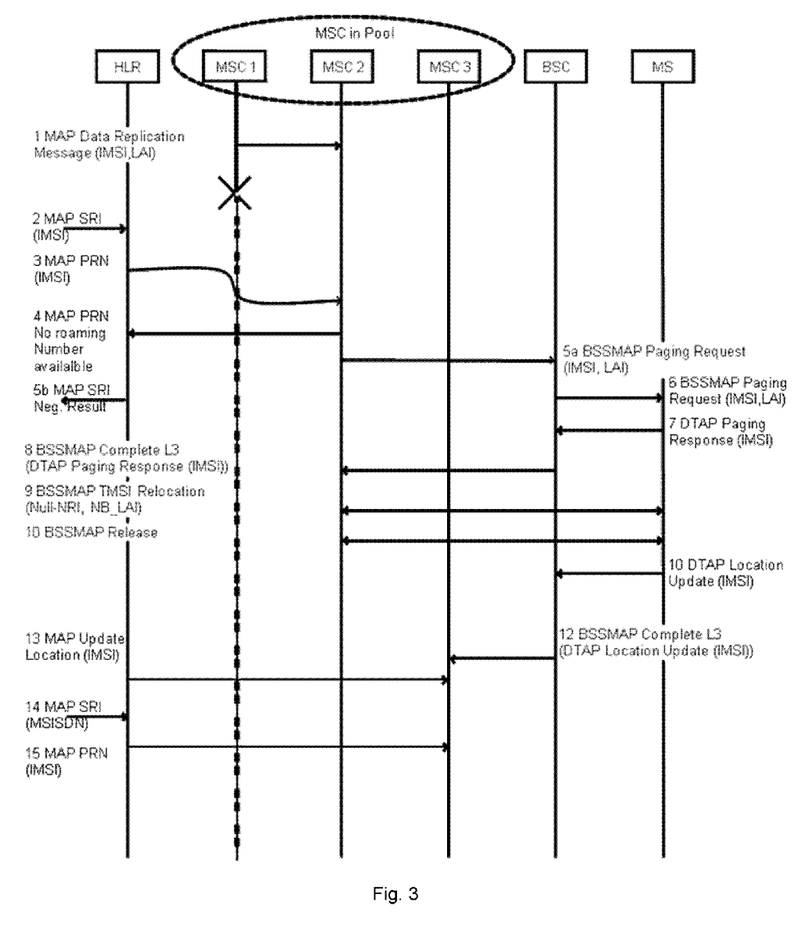
FIG. 3 is a signaling diagram illustrating exchange of signals of a first unsuccessful mobile terminated call.

A respective idea is shown in some details in FIG. 3. In FIG. 3 it is assumed that a radio access network node BSC is connected to a plurality of core network nodes MSC 1, MSC 2, MSC 3. A Mobile Station MS of a subscriber is registered in MSC 1. MSC 2 is configured as a fallback MSC for MSC 1. Hence, MSC 1 is providing subscriber data such as International Mobile Subscriber Identity, sometimes abbreviated IMSI, and Location Area Identifier towards its fallback MSC, i.e. MSC 2, see step 1. The fallback MSC is the MSC that shall handle the Mobile Terminating MT traffic for the failed MSC within the MiP. At a certain point in time indicated by the cross MSC 1 is failing.

Now if a call from an originating node is to be established towards said Mobile Station MS, at a certain point in time within the call processing a home location register HLR storing information pertaining to said subscriber is contacted, e.g. a MAP message such as Send Routing Information, sometimes abbreviated SRI, see step 2. The home location register HLR dispatches a message requesting a roaming number towards the MSC in which the Mobile Station is registered, i.e. MSC 1, e.g. a MAP message Provide Roaming Number, sometimes abbreviated PRN, see step 3. Since MSC 1 is failed, the message is rerouted towards the fallback MSC, i.e. MSC 2.

By checking the received IMSI as provided within the PRN message, MSC 2 determines that an MSC for which MSC 2 is configured as a fallback MSC is failed. Consequently, MSC 2 returns a PRN message with no roaming number available. Hence, the first mobile terminated call fails, see step 4.

In order to allow for a call processing for a next mobile terminated call, MSC 2 pages the concerned Mobile Station MS by sending BSSMAP message Paging Request with IMSI and the stored LAI towards the Radio Access Network BSC, see step 5*a*.

For the current call, the HLR responds to the service request with a negative result thereby the first mobile terminated call after failure will fail, see step 5*b*.

The BSC sends a Paging Request message with IMSI towards the Mobile Station MS, see step 6. After receiving paging request, the Mobile Station MS derives the IDNNS parameter from its IMSI and returns a Radio Resource Control RRC paging response message, see step 7.

The BSC, in turn, will forward this paging response message to MSC 2 as the originator of BSSMAP Paging Request with IMSI, see step 8. On reception of the success paging response, MSC 2 triggers a TMSI re-allocation procedure using the Non Broadcast Location Area Identifier which is unique for each MSC within the pool, sometimes abbreviated NB-LAI, and a TMSI comprising a Null-NRI, see step 9.

After receiving the TMSI re-allocation response from said Mobile Station MS, MSC releases the resource on the radio interface, see step 10. The Mobile Station MS performs a Location Update towards the network, see step 11. Based on some decision criteria, such as a capacity factor in MiP, the BSC forwards this Location Area request to MSC 3, see step 12.

Now, the Mobile Station MS is registered in MSC 3 and gets respective subscriber information from HLR in step 13.

Now if another call from an originating node is to be established towards said Mobile Station MS, at a certain point in time within the call processing a home location register HLR storing information pertaining to said subscriber is contacted, e.g. a MAP message such as Send Routing Information, sometimes abbreviated SRI, see step 14. The home location register HLR dispatches a message requesting a roaming number towards the MSC in which the Mobile Station is now registered, i.e. MSC 3, e.g. a MAP message Provide Roaming Number, sometimes abbreviated PRN, see step 15.

Since now the MSC 3 is not failed, this further mobile terminated call will be successful. This situation is not only experienced in GSM based networks, but as well in UMTS and LTE networks.

I.e. in CSFB (Circuit Switched Fallback) scenario within LTE, if a MSC in the pool fails, the respective MSC will/cannot send indication to Mobility Management Entity MME. As a consequence, the parameter VLR reliable in the core network node Mobility Management Entity, sometimes abbreviated MME, will be kept true, as from MME's point of view the SGs association of MME and MSCs towards the failed MSC is still kept until a combined Tracking Area Update Request (TAU) from the User Equipment (UE) is received. Upon the next TAU, MME will select another available MSC in the pool. The first MT CSFB call will always fail before the subscriber makes mobile originating attempt and gets registered in a new MSC Pool member or a periodic TAU.

A like situation is also experienced with respect to other services such as SMS service towards a Mobile Station being handled by a failing core network node within a pool of core network nodes.

SUMMARY

It is an object of the invention to obviate at least some of the above disadvantages and to provide an improved method for allowing a successful first mobile terminated call towards a mobile subscriber initially assigned to a failing core network node and an improved core network node.

The invention proposes a method for a fallback core network node within a pool of core network nodes for allowing a successful first mobile terminated call towards a mobile subscriber initially assigned to a failing core network node. The method comprises a step of receiving data associated to International Mobile Subscriber Identity and Location Area Identifier of a mobile subscriber handled in the failing core network node, and a step of receiving a service request from a home location register. In a further step it is determined by the fallback core network node that the fallback core network node is acting as a fallback core network node for the failing core network node. A further step pertains to sending a response to the service request towards the home location register comprising the Roaming Number of the fallback core network node. The methods also comprises a step of initiating a paging request towards the radio network comprising said received Location Area Identifier of said mobile subscriber, and a step of sending a Service Request towards the home location register comprising the Mobile Station Integrated Services Digital Network Number of the mobile subscriber.

In a further embodiment, the method further comprises a step of receiving a Cancel Location Request from the home location register with respect to the mobile subscriber.

In another embodiment, the method further comprises the step of awaiting an initial address message comprising the roaming number of the fallback core network node in response to a received Cancel Location Request and the determination of acting as fallback core network node.

In yet another embodiment, the method further comprises the steps of receiving at the fallback core network node data associated to Mobile Station Integrated Services Digital Network Number of said mobile subscriber handled in the failing core network node, and sending a Service Request towards the home location register comprising the Mobile Station Integrated Services Digital Network Number of the mobile subscriber.

In still a further embodiment, the method further comprises the step of receiving a request message from another core network node within the pool in response to the Paging Request, the message pertaining to the handling of the paging response with the core network node pool.

According to another embodiment, the core network node is supporting Resume Call Handling, the method further comprises the steps of receiving a Cancel Location Request from the home location register with respect to the mobile subscriber, receiving an initial address message from a originating core network node from which the call is originating, and sending a message towards said originating Gateway core network node that the call shall be released towards said fallback core network node in response to said received Cancel Location Request and said received initial address message.

According to yet another embodiment, the method further comprises the step of initiating a TMSI reallocation towards the radio network comprising a null-NRI.

According to another aspect of the invention, a respective core network node is proposed. Said core network node is intended for use within a pool of core network nodes, the core network node comprises a receiving unit adapted to receive data associated to International Mobile Subscriber Identity and Location Area Identifier of a mobile subscriber handled in a failing core network node, and adapted to receive a service request from a home location register, a sending unit adapted to send a paging request towards the radio network, comprising said received Location Area Identifier of said mobile subscriber, and adapted to send a Service Request towards the home location register comprising the Mobile Station Integrated Services Digital Network Number of the mobile subscriber, and adapted to send a response to the service request towards the home location register comprising the Roaming Number of the fallback, and a processing unit adapted to determine that the core network node is acting as a fallback core network node for the failing core network node, further adapted to Initiate said paging request.

BRIEF DESCRIPTION OF THE DRAWINGS

In the following the invention will be further detailed with respect to the figures.

DETAILED DESCRIPTION

Before embodiments of the invention are described in detail, it is to be understood that this invention is not limited to the particular component parts of the devices described or steps of the methods described as such devices and methods may vary. It is also to be understood that the terminology used herein is for purpose of describing particular embodiments only, and is not intended to be limiting. It must be noted that, as used in the specification and in the appended claims, the singular forms "a", "an" and "the" include singular and/or plural referents unless the context clearly indicates otherwise.

The particular combination of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and/or claims do not limit the scope of the invention as claimed.

In the following a pool of core network nodes is assumed. Although, it is described with respect to a GSM network, the invention is not limited thereto but may be also embodied in an UMTS, LTE or any other mobile telecommunication network such as iDEN or WiMAX.

A pool may comprise any number of core network nodes. However for ease of understanding only 3 Core Network Nodes MSC 1, MSC 2, MSC 3 are referenced in the following. Even though in the following only a single Radio Access Network Node BSC is referenced, also a number of Radio Network Nodes may be associated to one or more core network node as shown in FIG. 1.

In the following it is assumed that MSC 2 is configured as a fallback MSC for MSC 1. In order to be able to operate calls pertaining to subscribers registered in MSC 1, MSC 2 receives information pertaining to the subscribers handled by MSC 1. Said information may be provided either directly from MSC 1 or it may be provided by the HLR. The information pertains to data associated to International Mobile Subscriber Identity IMSI and Location Area Identifier LAI of one or more mobile subscriber MS handled in the failing MSC 1, see step 1 in FIG. 4.

Figure 4:
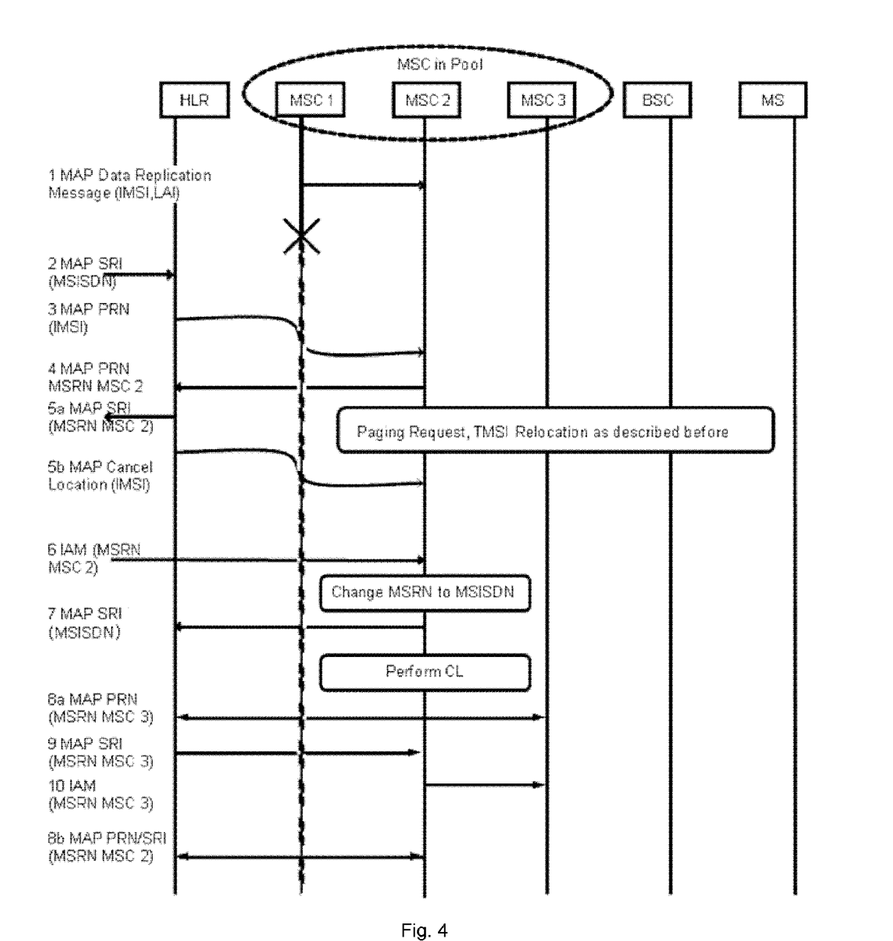
FIG. 4 is a signaling diagram illustrating exchange of signals in an embodiment of a network.

At a certain point in time indicated as a cross in FIG. 4 MSC 1 fails for some reason.

Later on the HLR receives a service request by an originating MSC comprising the MSISDN of the subscriber MS, see step 2. The HLR tries to contact the MSC 1 in which the Mobile Station MS is registered. Since MSC 1 is failed, the contacting is routed towards MSC 2 which is configured as fallback MSC for MSC 1, see step 3. As the data pertaining to said subscriber is comprised in the information pertaining to subscribers registered in MSC 1, MSC 2 may deduce that MSC 1 is failed and that MSC 2 is acting as a fallback MSC. Also it may be envisaged that due to alternative routing a different Subsystem Number SSN is comprised in the service request sent by the HLR and received by the MSC 2.

The fallback MSC 2 knowing that it is acting as a fallback MSC sends a response to the service request towards the home location register HLR comprising the MS Roaming Number assigned by the fallback core network node, see step 4.

The HLR responds to the Service Request received in step 2 and provides the received MSRN assigned by the fallback MSC 2 towards the originating MSC in step 5*a*.

The MSC 2 initiates a paging request towards the radio network comprising said received Location Area Identifier of said mobile subscriber and the IMSI of said subscriber as described with respect to steps 5*a*-8 in FIG. 3, and may additionally initiate a TMSI relocation comprising a Null-NRI and NB-LAI (Non Broadcast LAI) as described with respect to steps 9-12 in FIG. 3.

In another step 5*b* which may be performed at the same time as step 5*a* or there before or thereafter, HLR issues a Cancel Location (CL) with respect to the Mobile Station MS. This Cancel Location may be accompanied by the IMSI of the Mobile Station MS or any other data allowing for identifying said Mobile Station MS.

MSC 2 knowing that it is acting as a fallback MSC for the subscriber MS as indicated above in step 3, is suspending processing of the Cancel Location (CL) and awaits an Initial Address Message (IAM) of the originating MSC comprising the MSRN as assigned by the MSC 2 in step 6.

Once the Initial Address Message is received, MSC 2 issues a service request (MAP SRI) towards the Home Location Register HLR just as an originating core network node would do, see step 7. This service request may comprise the MSISDN of the Mobile Station MS.

On or after issuing the service request of step 7, the actual Cancel Location (CL) is performed.

Depending on the situation where the Mobile Station MS is registered the further handling may differ.

In a first case, it is assumed that the Mobile Station MS is now registered in MSC 3. As the home location register HLR is informed thereof, the home location register HLR requests and receives in step 8a the MSRN assigned by MSC 3, i.e. like in steps 3 and 4. Now that the HLR has the data requested by the MSC 2, it responds in step 9 with a message indicating MSRN assigned by MSC 3.

MSC 2 now forwards the Initial Address Message (IAM) received in step 6 towards MSC 3 comprising the MSRN assigned MSC 3, see step 10.

In the second case, it is assumed that the Mobile Station MS is again registered in MSC 2. As the home location register HLR is informed thereof, the home location register HLR requests and receives in step 8b the MSRN assigned by MSC 2 now acting as ordinary MSC, i.e. like in steps 3 and 4 and the HLR has the data requested by the MSC 2, it responds with a message indicating MSRN assigned by MSC 2.

Thereafter the call will be processed like any other call and will successfully be completed.

I.e. by virtue of the invention, it is provisioned that not only second and further mobile terminated calls will be successful, but also the first mobile terminated call towards a Mobile Station MS after failure of the MSC in which said Mobile Station MS is registered.

As it is apparent some of the method steps may be arranged in a different sequence and some may even be left out.

For example, it may be foreseen that receipt of the Initial Address Message IAM (shown as step 6 in FIG. 4) at the fallback MSC 2, triggers IMSI paging request and TMSI reallocation with null NRI and invalid LAI (shown between step 4 and 5a in FIG. 4). Triggered by the paging request the Mobile Station MS will effect a location update and registers to an MSC within the Pool.

It is also foreseen that the mobile communication network supports a feature like Mobile Terminating Roaming Retry Call (e.g. as specified in 3GPP T523.018 ch5.2.1), MSC 2 sends a Resume Call Handling message, sometimes abbreviated RCH, towards an originating Gateway MSC to release the call towards MSC 2. Originating Gateway MSC will re-send a new SRI to HLR, i.e. like MSC 2 in step 7 of FIG. 4. HLR will contact the MSC where the subscriber is now registered due to the location update and registration to an MSC in Pool and route the call to the now registered MSC. Hence, the first Mobile Terminated call will be handled successfully. I.e. in this alternative no MSISDN is necessitated for that it may not be provided in step 1 of FIG. 4.

Figure 5:
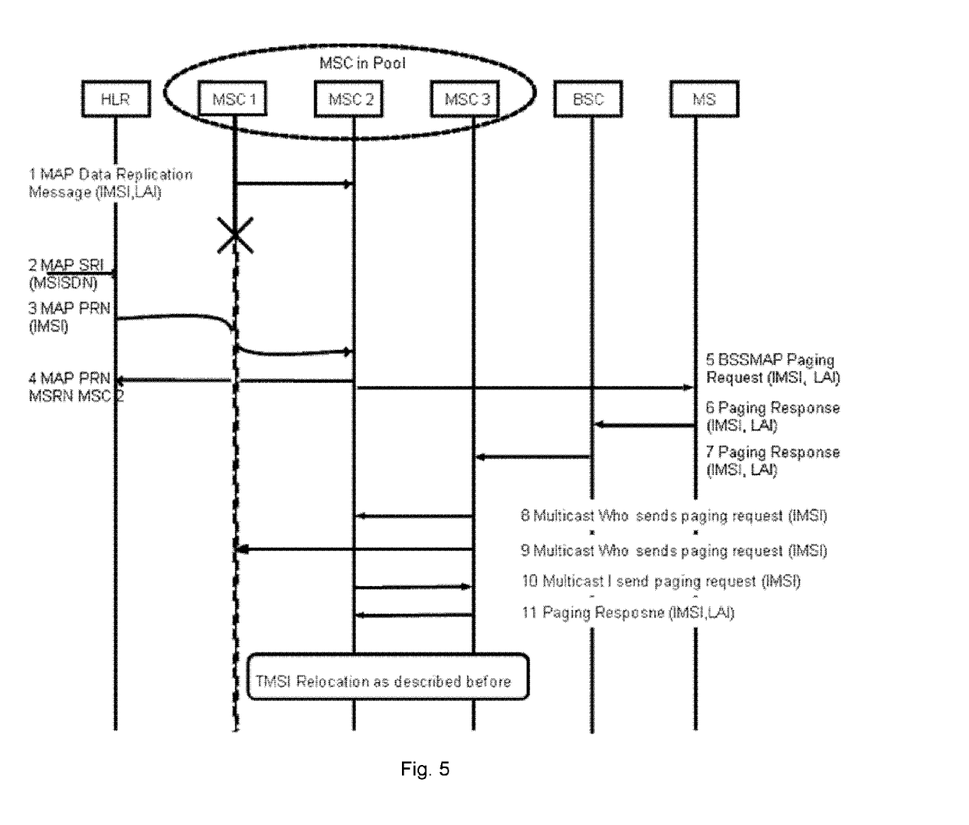
FIG. 5 is a signaling diagram illustrating exchange of signals in an embodiment of a network

In another embodiment described with respect to FIG. 5 a multicast environment with respect to the MSC in pool BSC communication is envisaged. There a Circuit Switched Fall Back Scenario is assumed, which is a typical situation in networks developing towards new technologies. I.e. in an LTE or UMTS network, the GSM network provides fallback service in case there is no more coverage by the new deployed UMTS and/or LTE networks. In the following an LTE network (respectively a SAE network) is assumed.

When MSC 2 receives MAP PRN message in step 3 for a Mobile Station MS registered in the failed MSC 1, MSC 2 allocates a MSRN as normal procedure, see step 4. Thereupon or thereafter MSC 2 sends in step 5 a paging request comprising IMSI, LAI via a Mobility Management Entity MME (not shown in FIG. 5) e.g. via SG interface between MSC and MME. The MME then pages the User Equipment UE. The User Equipment UE sends in step 6 a paging response (IMSI, LAI) towards BSC. Since the BSC is unaware which Core Network Node initiated the paging request, the paging response is forwarded by the BSC towards a random MSC in the pool, e.g. MSC 3, see step 7. This MSC 3 forwards the paging response to MSC 2, see step 8, and to MSC 1, see step 9, by one or more multicasting messages.

MSC 2 being aware of its sending in step 5 answers in step 10, that it is the origin of the paging request. MSC 3 then sends the paging response towards MSC 2, see step 11. Thereafter, the processing can be like described before in the different alternatives.

Figure 6:
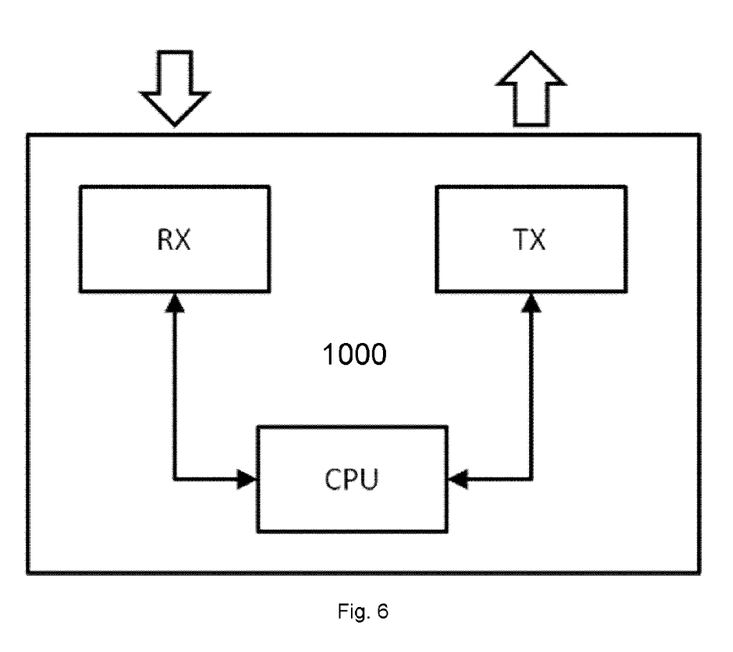
FIG. 6 is a block diagram illustrating an exemplary core network node.

A respective core network node CNN 1000 is shown schematically in FIG. 6. There Core Network Node CNN is intended for use within a pool of core network nodes. The Core Network Node CNN 1000 comprises a receiving unit RX adapted to receive data associated to International Mobile Subscriber Identity IMSI and Location Area Identifier LAI of a Mobile station MS handled in a failing Core Network Node. The receiving unit RX is further adapted to receive a service request PRN from a home location register HLR. The receiving unit RX may be stand alone or integrated with a sending unit TX. For example, the receiving unit RX may be arranged as a network interface chip or a network interface card or other circuitry such as FPGA or ASIC.

The Core Network Node CNN 1000 also comprises a sending unit TX adapted to send a paging request towards the radio network BSC, RNC, MME, comprising said received Location Area Identifier LAI of said Mobile Station MS. The sending unit TX is further adapted to send a Service Request towards the home location register HLR comprising the Mobile Station Integrated Services Digital Network Number MSISDN of the Mobile Station MS, and to send a response to the service request towards the HLR comprising the roaming Number MSRN assigned by the fallback Core Network Node CNN. The sending unit TX may be stand alone or integrated with a receiving unit RX. For example, the sending unit TX may be arranged as a network interface chip or a network interface card or other circuitry such as FPGA or ASIC.

In addition the Core Network Node CNN 1000 also comprises a processing unit CPU adapted to determine that the Core Network Node CNN 1000 is acting as a fallback Core Network Node. The processing unit CPU is further adapted to initiate a paging request towards the radio network BSC, RNC, MME, wherein a valid Location Area Identifier LAI is comprised. The processing unit CPU may be embodied in a microprocessor, a microcontroller, a Field Programmable Gate Array FPGA, an application-specific integrated circuit ASIC or any other appropriate circuitry.

Another embodiment of a Core Network Node CNN may further be such that the sending unit TX is further adapted to send a response towards the home location register HLR comprising the roaming number MSRN assigned by the fallback Core Network Node CNN, and that the receiving unit RX is further adapted to receive a Cancel Location Request from the home location register HLR with respect to the Mobile Station MS.

Still another embodiment of a Core Network Node CNN may further be such that the processing unit CPU is adapted to await an initial address message IAM comprising the roaming number MSRN assigned by the fallback Core Network Node CNN in response to a received Cancel Location Request and the determination of acting as fallback Core Network Node.

According to yet another embodiment, a Core Network Node CNN may further be such that the receiving unit RX is adapted to receive data associated to Mobile Station Integrated Services Digital Network Number MSISDN, and the sending unit TX is adapted to send a Service Request SRI towards the HLR comprising the Mobile Station Integrated Services Digital Network Number MSISDN of the Mobile Station MS.

Another embodiment of a Core Network Node CNN may further be such that the receiving unit RX is further adapted to receive a request message from another Core Network Node within the pool in response to the Paging Request, the message pertaining to the handling of the paging response with the Core Network Node pool.

Still another embodiment of a Core Network Node CNN may further support Resume Call Handling, and the receiving unit RX may further be adapted to receive a Cancel Location Request from the home location register HLR with respect to the Mobile Station MS, and to receive an initial address message IAM from a originating core network node from which the call is originating, and the sending unit TX is further adapted to send a message towards said originating Gateway Core Network Node from which the call is originating that the call shall be released towards the sending Core Network Node CNN in response to said received Cancel Location Request and said received initial address message IAM.

In summary, and again with respect to the describe GSM related embodiments, when MSC 2 receives a MAP PRN message for a subscriber registered in the failed MSC 1, MSC 2 shall restore data from HLR or has already received in advance data from MSC 1 and allocates a MSRN.

In a first solution, MSC 2 will trigger IMSI paging, TMSI reallocation with null NRI and invalid LAI towards the access network, respectively the Mobile Station MS. The Mobile Station MS will do the location update immediately and register to a new MSC in pool, HLR will send a Cancel Location message to MSC 1 and MSC 2 will receive Cancel Location due to alternative routing. IAM will then be routed to MSC 2, MSC 2 shall wait for both IAM and Cancel Location messages for the same Mobile Station MS arriving, CL messages indicates that the subscriber is already successfully registered in a new MSC in the pool. MSC 2 shall suspend CL message and handle the IAM message. MSC 2 shall replace the MSRN by MSISDN (MSISDN shall be replicated to standby MSC). Then MSC 2 re-sends a new SRI to HLR, HLR will contact with the new MSC where the subscriber is newly registered, and route the call to the new MSC. Then the first MT call will be handled successfully.

In a second solution, when an IAM message arrives at MSC 2, MSC 2 will trigger IMSI paging, TMSI reallocation with null NRI and invalid LAI towards the access network, respectively the Mobile Station MS. The Mobile Station MS will do the location update immediately and register to a new MSC in Pool. Since Mobile Terminating Roaming Retry Call (e.g. as specified in 3GPP T523.018 ch5.2.1) is supported in the network, MSC 2 sends a RCH (Resume Call Handling) message to GMSC to release the call towards MSC 2. GMSC will re-send a new SRI to HLR (still a "basic call" interrogation type). HLR will contact with the new MSC where the subscriber is newly registered and route the call to the new MSC. Then the first MT call will be handled successfully.

In a third solution, relating to a Circuit Switched Fallback scenario, when MSC 2 receives MAP PRN message for a Mobile Station MS registered in the failed MSC 1, MSC 2 shall restore data from HLR or has already received in advance data from MSC 1 and allocate a MSRN. Then MSC 2 sends a paging request comprising IMSI and LAI towards the Radio Access Network, e.g. towards MME. MME pages the User Equipment UE which may be in idle mode, UE will send paging response (IMSI, LAI) to BSC/RNC, since BSC/RNC doesn't know which Core Network Node initiated the paging request, the paging response is forwarded to a random MSC in the pool. The random MSC forwards the paging response to MSC 2 by multicasting message. When paging response is received in MSC 2, the solution can proceed as described within first and second solution.

In the following we will refer to the flowchart illustrating embodiments of method steps as shown in FIGS. 7-10.

Figure 7:
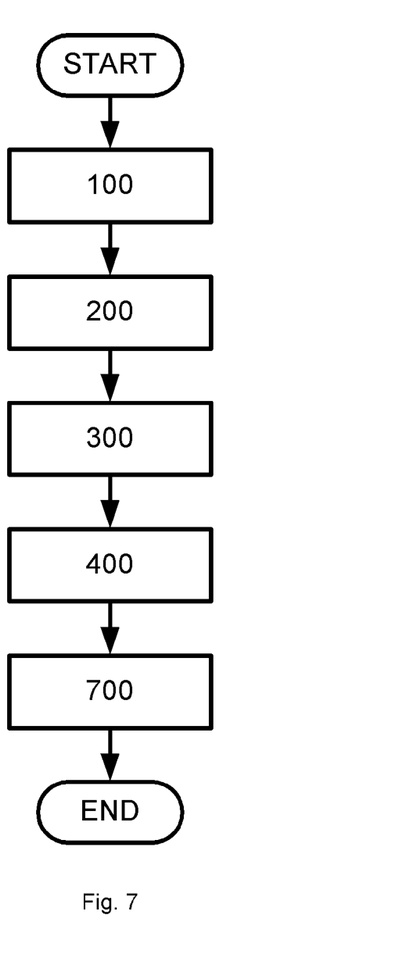
FIG. 7 is a flowchart illustrating a first embodiment of method steps.

The Method is performed by a fallback Core Network Node CNN, e.g. MSC 2, within a pool of core network nodes, e.g. MSC 1, MSC 2, MSC 3, for allowing a successful first mobile terminated call towards a mobile subscriber MS initially assigned to a failing core network node MSC 1.

Referring to FIG. 7, in step 100 data associated to International Mobile Subscriber Identity IMSI and Location Area Identifier LAI of a mobile subscriber MS handled in a possibly failing core network node MSC 1 is received within the fallback Core Network Node CNN, MSC 2. This information may originate from the possibly failing core network node itself MSC 1 or from a subscriber register such as a home location register HLR or HSS. At a certain point in time after the failing core network node MSC 1 actually failed, the fallback Core Network Node CNN, MSC 2 receives in step 200 a service request (MAP PRN) from a home location register HLR, whereby the service request indicates that the fallback Core Network Node is acting as a fallback Core Network Node CNN, MSC 2 for the failing core network node MSC 1. The Core Network Node CNN sends in step 300 a response (MAP PRN MSRN) to the service request (MAP PRN) towards the home location register HLR comprising the roaming Number (MSRN) assigned by the fallback Core Network Node CNN. The fallback Core Network Node CNN, MSC 2 also initiates in step 400 a paging request towards the radio network BSC, RNC, MME comprising said received Location Area Identifier of said mobile subscriber MS. In step 700 a Service Request (MAP SRI, MAP PRN) is sent towards the home location register HLR comprising the Mobile Station Integrated Services Digital Network Number of the mobile subscriber.

Figure 8:
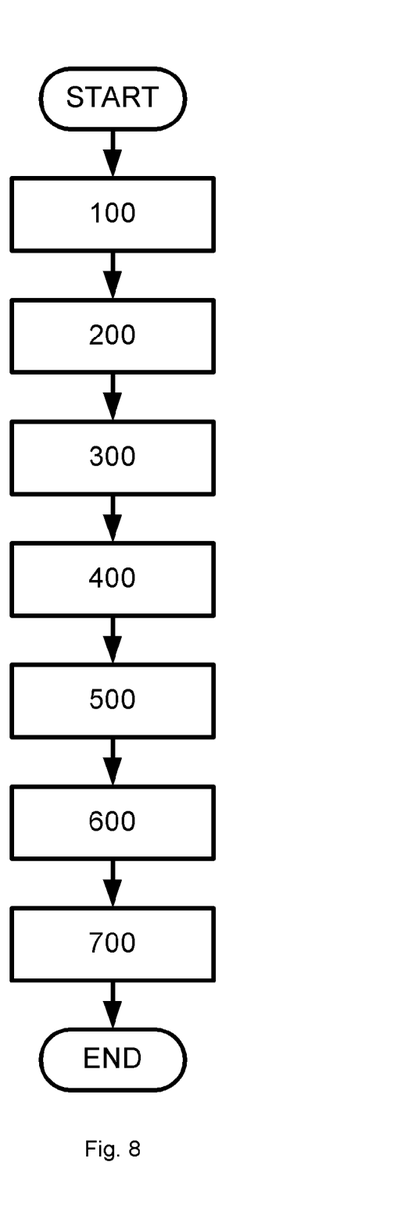
FIG. 8 is a flowchart illustrating a second embodiment of method steps.

Referring to FIG. 8, the method may be augmented by step 500 of receiving a Cancel Location Request from the home location register with respect to the mobile subscriber. Furthermore, the method may be augmented such that in response to a received Cancel Location Request of step 500 and the determination of acting as fallback core network node of step 200, an initial address message is awaited, which is received in step 600 and which comprises the roaming number assigned by the fallback core network node, MSC 2. Once these messages are received, the actual Cancel Location Procedure within the Core Network Node CNN, MSC 2 may be performed. Cancel Location Procedure may in some embodiments preferably be performed on or after a service request towards the HLR is prepared comprising, e.g., MSISDN of the mobile subscriber.

Figure 9:
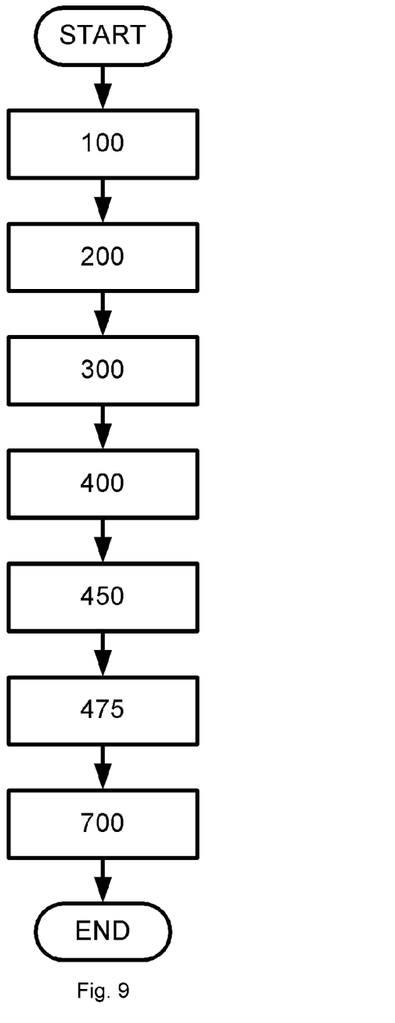
FIG. 9 is a flowchart illustrating a third embodiment of method steps.
Figure 10:
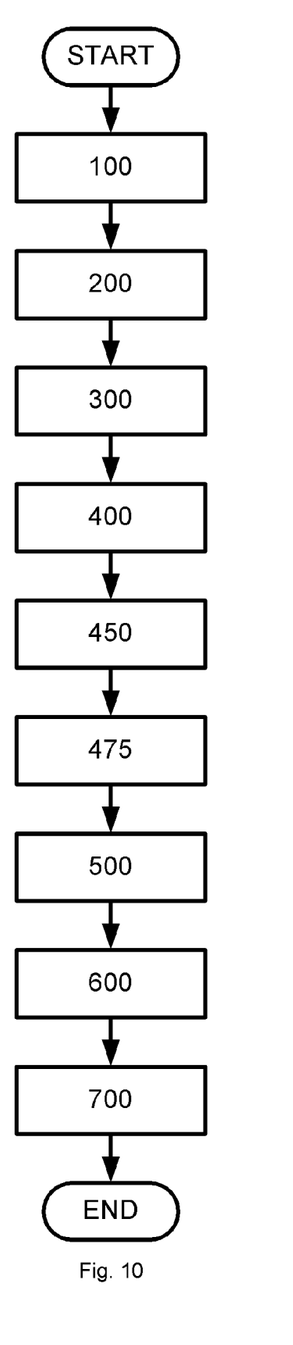
FIG. 10 is a flowchart illustrating a fourth embodiment of method steps.

Referring to FIGS. 9 and 10, in case Circuit Switched Fallback is supported by the network, the method may offer step 450 in which a request message from another core network node MSC 3 within the pool is received in response to the Paging Request sent in step 400, the request message pertaining to the handling of the paging response with the core network node pool. In step 475, MSC 2 receives the paging response forwarded by MSC 3.

In some cases the method may be such that data associated to Mobile Station Integrated Services Digital Network Number MSISDN of said mobile subscriber MS being handled in the failing core network node MSC 1 is received by the fallback Core Network Node MSC 2, CNN either within the Date received from the failing Core Network Node CNN, MSC 1 or from the Home Location Register HLR or by any other means. The MSISDN may be used within said step 700 where a Service Request (MAP SRI) is sent towards the home location register HLR comprising the Mobile Station Integrated Services Digital Network Number MSISDN of the mobile subscriber MS along or instead of the MSRN assigned by MSC .

By virtue of the invention in its different embodiments and variations thereof, it is ensured that also the first Mobile Terminated call irrespective of its service type will be successful in case the core network node in which the subscriber is registered failed.

Therefore, the overall Mobile Terminated call success rate is increased and the overall network and air traffic load due to paging repetition as in prior art is reduced leading to an improved efficiency.

Again, it is to be noted that the terminology of a call does not only relate to a voice call but also to other services in particular SMS services.

Although the invention has been described with respect to a pool environment, where the pool is comprised of physical separate entities, the invention may also be embodied in a Blade Cluster environment, where a pool is provided by physically condensed blades offering core network node functionality.

It is to be understood, that within although the invention has been described mainly with respect to entities of a GSM network, the principles may as well be embodied in any other mobile communication network such as a UMTS, LTE, WiMAX, iDEN network. Hence, a radio access network node may be embodied e.g. in a Radio Network controller RNC or in a Mobility Management Entity or any other respective node within other networks offering a like functionality. Likewise, an HLR may also be embodied by an HSS in an UMTS network or any other respective node within other networks offering a like functionality.

Furthermore, even though the invention has been described with respect to a mobile communication network, the same principles may be applied towards fixed network environments, i.e. towards TSC in pool respectively TSC Blade Cluster environment.

The particular combination of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and/or claims do not limit the scope of the invention as claimed.

The invention claimed is:

1. A method for a fallback core network node within a pool of core network nodes for allowing a successful first mobile terminated call towards a mobile subscriber initially assigned to a failing core network node, the method comprising the steps of:
   receiving, via a receiver circuit, data associated to International Mobile Subscriber Identity and Location Area Identifier of a mobile subscriber handled in the failing core network node,
   receiving, via the receiver circuit, a service request from a home location register,
   determining, via a processor circuit, that the service request indicates that the fallback core network node is acting as a fallback core network node for the failing core network node,
   sending, via a transmitter circuit, a response to the service request towards the home location register comprising a roaming Number assigned by the fallback core network node,
   initiating, via the processor circuit, of paging request towards the radio network comprising said received Location Area Identifier of said mobile subscriber, and
   sending, via the transmitter circuit, a Service Request towards the home location register comprising a Mobile Station Integrated Services Digital Network Number of the mobile subscriber.

2. The method according to claim 1, further comprising the step of:
   receiving a Cancel Location Request from the home location register with respect to the mobile subscriber.

3. The method according to claim 1, further comprising the step of:
   in response to a received Cancel Location Request and the determination of acting as fallback core network node, awaiting an initial address message comprising the roaming number assigned by the fallback core network node.

4. The method according to claim 1, farther comprising the steps of:
   receiving at the fallback core network node data associated to Mobile Station Integrated Services Digital Network Number of said mobile subscriber handled in the failing core network node, and
   sending said Service Request towards the home location register comprising the Mobile Station Integrated Services Digital Network Number of the mobile subscriber.

5. The method according to claim 1, further comprising the step of:
   receiving a request message from another core network node within the pool in response to the Paging Request, the message pertaining to the handling of the paging response with the core network node pool.

6. The method according to claim 1, wherein the core network node is supporting Resume Call Handling, the method further comprising the steps of:
   receiving a Cancel Location Request from the home location register with respect to the mobile subscriber,
   receiving an initial address message from a originating core network node from which the call is originating, and
   sending a message towards said originating Gateway core network node that the call shall be released towards said fallback core network node in response to said received Cancel Location Request and said received initial address message.

7. The method according to claim 1, further comprising the step of:
   initiating a TMSI reallocation towards the radio network comprising a null-NRI.

8. A core network node for use within a pool of core network nodes, the core network node comprising:
   a receiver circuit receives data associated to International Mobile Subscriber identity and Location Area Identifier of a mobile subscriber handled in a failing core network node, and receives a service request from a home location register, the service request indicates that the fallback core network node is acting as a fallback core network node for the failing core network node,
   a transmitter circuit sends a paging request towards the radio network, comprising said received Location Area Identifier of said mobile subscriber, sends a Service Request towards the home location register comprising the Mobile Station integrated Services Digital Network Number of the mobile subscriber, and sends a response to the service request towards the home location register comprising a roaming Number assigned by the fallback core network node, and
   a processor circuit determines that the core network node is acting as a fallback core network node for the failing core network node, and initiates said paging request.

9. The core network node according to claim 8, wherein:
   the receiver circuit receives a Cancel Location Request from the home location register with respect to the mobile subscriber.

10. The core network node according to claim 8, wherein;
    the processor circuit awaits an initial address message comprising the roaming number assigned by the fallback core network node in response to a received Cancel Location Request and the determination of acting as fallback core network node.

11. The core network node according to claim 8, wherein:
    the receiver circuit receives data associated to Mobile Station Integrated Services Digital Network Number of said mobile subscriber handled in the failing core network node, and
    the sending circuit sends a Service Request towards the home location register comprising the Mobile Station integrated Services Digital Network Number of the mobile subscriber.

12. The core network node according to claim 8, wherein:
    the receiver circuit receives a request message from another core network node within the pool in response to the Paging Request, the message pertaining to the handling of the paging response with the core network node pool.

13. The core network node according to claim 8, wherein the core network node is supporting Resume Call Handling, and wherein;
    the receiver circuit receives a Cancel Location Request from the home location register with respect to the mobile subscriber, and receives an initial address message from a originating core network node from which the call is originating, and
    the sending circuit sends a message towards said originating Gateway core network node from which the call is originating that the call shall be released towards the sending core network node in response to said received Cancel Location Request and said received initial address message.

14. The core network node according to claim 8, wherein:
    the sending circuit sends a TMSI reallocation request towards the radio network comprising a null-NRI, and
    the processor circuit initiates said TMSI reallocation request.

* * * * *